United States Patent Office 3,086,949
Patented Apr. 23, 1963

3,086,949
PROCESS OF CONVERTING FREE CARBOXYLIC ACID GROUPS IN LIQUID ESTER COATING COMPOSITIONS TO HALF-ESTER GROUPS WITH RETENTION OF THE COATING COMPOSITION IN THE LIQUID STATE
Herbert Walter Chatfield, Croydon, England, assignor to A. Boake, Roberts & Company Limited, London, England
No Drawing. Filed Nov. 4, 1957, Ser. No. 694,072
Claims priority, application Great Britain Nov. 14, 1956
6 Claims. (Cl. 260—22)

This invention relates to surface coatings and in particular to a process for the reduction of free acidity in varnishes, oils, resins and like compounds of organic acids liable to have or to develop free acidity.

It is known that the presence of free organic acids in surface coating materials causes difficulties, such for example, as the formation of soaps with basic pigments which gives an undesirable increase to the viscosity of the composition. Furthermore the presence of free acidity interferes with leafing and metallic lustre in aluminium paints and causes a reduction of moisture resistance in coating compositions. In consequence the acidity of compositions of the above type has been reduced by reacting the film forming compound with a polyhydric alcohol such as glycerol.

In my co-pending British application No. 34,852/56 (which corresponds to my co-pending U.S. application Ser. No. 694,073, now issued as Patent No. 2,909,537), a process for the production of an improved drying oil compound is described which is based upon the discovery that drying oil fatty acids can be made to react with epoxidized oils and in a similar way it has now been found that free acidity may be reduced by reacting an epoxidized oil with the compound having free acidity or with compositions containing said compound. In this way the acid contained in the compound treated combines with the epoxide group contained in the epoxidized oil to form a half ester of a glycol according to the following reaction:

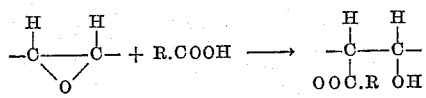

The hydroxyl group which is provided after the first stage of the reaction is also available for the neutralization of free acid.

According to the present invention therefore a process for reducing or inhibiting the formation of free acidity in esters and other compounds of organic acids or compositions containing the said compounds comprises reacting the said compound or a composition containing it with an epoxidized oil until a substantial reduction in the acid value is attained. Preferably the reaction is carried out at a temperature of the order of 230° C. and the heating is continued until the desired reduction in the acidity is attained.

The proportion of epoxidized oil added is not critical but any excess over that required to combine with free acid will tend to reduce the drying properties of the composition. Generally not more than 10% epoxidized oil will be required.

It has been found that the free acidity of rosin acids, modified rosin acids, natural copal resins, alkyds, rosin-modified natural and synthetic resins and their esters, vegetable, marine, natural and processed, and other drying oils of the ester type, could be reduced by heating with an epoxidized oil. The following table gives the results of tests made on two different resins:

Table 1

| Resin | Acid values | | | Melting points (B & R) | |
|---|---|---|---|---|---|
| | Initial | After 1 hr./ 230° C. | 2 hrs./ 230° C. | Initial | 2 hrs./ 230° C. |
| Rosin maleic anhydride ester +5% epoxidized oil | 10.9 | 3.4 | 3.4 | ° C. 131.5 | ° C. 124 |
| Copal ester (glycerol) +5% epoxidized oil | 6.7 | 2.2 | 1.7 | 86.5 | 102.5 |

A typical 65% oil length linseed glycerol alkyd was prepared using 10% excess glycerol over theoretical requirements. A further identical alkyd was processed under similar conditions and at the same time, but had 10% of epoxidized oil added after 6 hours' processing. Both alkyds were heated at 230° C. and acid values determined at intervals. The results are given in Table 2 as follows:

Table 2

| Time of heating at 230° C. | Acid values— Alkyd I (No epoxidized oil) | Acid values— Alkyd II (after 6 hrs. epoxidized added) |
|---|---|---|
| 4 hrs | 18.7 | 21.4 |
| 6 hrs | 14.7 | 17.3 |
| 8 hrs | 9.1 | 6.2 |
| 10 hrs | 9.4 | 6.1 |

The temperature of the reaction has a considerable effect on the rate of the reaction as will be seen from the results of tests on two stand oils given in Table 3 below:

Table 3

| Stand oil | Temperature, ° C. | Time of heating, hrs. | Acid value | |
|---|---|---|---|---|
| | | | Initial | Final |
| Linseed (30 p.)+6.7% epoxidized oil | 170 | 4 | 9.4 | 7.2 |
| | | 8 | | 6.5 |
| Linseed (30 p.)+6.7% epoxidized oil | 230 | 1 | 9.4 | 5.5 |
| Dehydrated castor oil, Stand oil (7 p.)+6.7% epoxidized oil | 240 | 1 | 12.9 | 5.6 |

I claim:
1. The process for inhibiting free carboxylic acidity in liquid coating compositions containing, as an essential film-forming ingredient, acid esters of organic acids selected from the group consisting of natural resins, modified natural resins, and synthetic resins, said acid esters having a free acid number of over 6 from retained —COOH groups, which comprises mixing said liquid composition with an epoxidized fatty oil having internal oxirane bridging two adjacent carbons on the fatty chain portion of said oil, and heating the resulting mixture to a temperature of from about 170° to 240° C., whereby said retained —COOH groups of the film-forming ingredient are reacted with said oxirane groups to form glycollic half ester groups while retaining the film-forming property of the composition.

2. The process as set forth in claim 1 in which the said film-forming ingredient is an alkyd resin.

3. The process as set forth in claim 1 in which the said film-forming ingredient is a copal resin.

4. The process as set forth in claim 1 in which the said film-forming ingredient is a modified natural resin.

5. The process as set forth in claim 1 in which the epoxidized fatty oil is a glyceride oil.

6. The liquid coating composition produced by the process of claim 1.

References Cited in the file of this patent

UNITED STATES PATENTS

| | | |
|---|---|---|
| 2,556,145 | Niederhauser | June 5, 1951 |
| 2,682,514 | Newey | June 29, 1954 |
| 2,732,367 | Shokal | Jan. 24, 1956 |
| 2,907,723 | Greenlee | Oct. 6, 1959 |
| 2,907,728 | Greenlee | Oct. 6, 1959 |

FOREIGN PATENTS

| | | |
|---|---|---|
| 737,697 | Great Britain | Sept. 28, 1955 |